United States Patent [19]

Nakahori et al.

[11] Patent Number: 4,844,948

[45] Date of Patent: Jul. 4, 1989

[54] METHOD OF MANUFACTURING NICKEL HYDROXIDE ELECTRODE FOR ALKALINE STORAGE CELL

[75]. Inventors: Shinsuke Nakahori; Hironori Honda, both of Sumoto, Japan

[73] Assignee: Sanyo Electric Co., Ltd., Osaka, Japan

[21] Appl. No.: 162,453

[22] Filed: Mar. 1, 1988

[30] Foreign Application Priority Data

Mar. 3, 1987 [JP] Japan ................................. 62-48248

[51] Int. Cl.[4] .......................... B05D 5/12; H01M 4/52
[52] U.S. Cl. .................. 497/126.3; 429/223; 427/247
[58] Field of Search ............... 427/126.3, 58; 429/223, 429/206

[56] References Cited

U.S. PATENT DOCUMENTS

| | | | |
|---|---|---|---|
| 3,951,686 | 4/1976 | Ness et al. ........................ | 429/223 |
| 4,029,132 | 6/1977 | Jackovitz et al. ................ | 429/223 |
| 4,603,094 | 7/1986 | Yasuda ............................. | 429/206 |

FOREIGN PATENT DOCUMENTS

| | | | |
|---|---|---|---|
| 0088929 | 8/1978 | Japan ................................ | 429/223 |
| 0126131 | 11/1978 | Japan ................................ | 429/223 |
| 0141172 | 11/1981 | Japan ................................ | 429/223 |
| 57-5018 | 1/1982 | Japan . | |
| 62-37874 | 2/1987 | Japan . | |
| 62-58566 | 3/1987 | Japan . | |

*Primary Examiner*—Donald L. Walton
*Attorney, Agent, or Firm*—Armstrong, Nikaido Marmelstein Kubovcik & Murray

[57] ABSTRACT

A method of manufacturing a nickel hydroxide electrode for use in an alkaline storage cell. The disclosed method comprises a first step of forming cobalt hydroxide on surfaces of a porous nickel sintered plaque, a second step of changing the cobalt hydroxide into cobalt oxyhydroxide, and a third step of carrying out an active material filling operation for the sintering plaque formed with the cobalt oxyhydroxide.

16 Claims, 5 Drawing Sheets

METHOD OF MANUFACTURING NICKEL HYDROXIDE ELECTRODE FOR ALKALINE STORAGE CELL

BACKGROUND OF THE INVENTION

(1) Field of the Invention

The present invention relates to a method of manufacturing a nickel hydroxide electrode of the sintered type for use in an alkaline storage cell, in which a porous nickel sintered plaque is filled with active materials by impregnating the sintered plaque with an acid nickel salt such as nickel nitrate, and thereafter subjecting it to an alkali treatment.

(2) Description of the Prior Art

A conventional method of manufacturing a nickel hydroxide electrode of the sintered type for use in an alkaline storage cell employs an active material filling operation. In this operation, a porous nickel sintered plaque to act as a support for an active material is immersed in a solution of an acid nickel salt such as nickel nitrate to impregnate pores of the sintered plaque with the nickel salt, and thereafter the nickel salt is activated by changing it into nickel hydroxide through contact with alkali solution. However, one such active material filling operation cannot fill the nickel sintered plaque with a sufficient amount of active material. This operation must be repeated several times to fill the sintered plaque with a sufficient amount of active material, which results in a low efficiency of active materials filling work.

In order to improve the active materials filling efficiency and simplify the manufacturing process, a molten salt solution such as a high temperature and high concentration aqueous solution of nickel nitrate is used to obtain a necessary amount of active material through a reduced number of impregnating steps. In this case, however, the impregnant solution naturally is highly corrosive and the sintered plaque is thereby corroded. Consequently, the nickel forming the sintered plaque becomes dissolved to embrittle the electrode. The cell incorporating such an electrode has a reduced cycle performance.

On the other hand, Japanese patent publications kokai Nos. 59-78457 and 59-96659 have proposed a method of preventing the corrosion of the sintered plaque by forming oxidation-resistant nickel oxide on surfaces of the nickel sintered plaque in the presence of oxygen and at high temperature. According to this method, however, the corrosion of the sintered plaque cannot be checked sufficiently if nickel oxide is formed in a small amount. On the other hand, if an increased amount of nickel oxide is formed in an attempt to obtain satisfactory results, the conductivity between the active material and sintered plaque will be seriously impaired since nickel oxide has a poor conductivity. This gives rise to the problem of lowering the utilization factor of the active material.

SUMMARY OF THE INVENTION

The object of the present invention, therefore, is to provide a method of manufacturing a nickel hydroxide electrode for use in an alkaline storage cell, which effectively prevents corrosion of a nickel sintered plaque in a hot impregnant acid solution and at the same time maintains the conductivity between the active material and sintered plaque.

This object is fulfilled, according to the present invention, by a method of manufacturing a nickel hydroxide electrode comprising a first step of forming cobalt hydroxide on surfaces of a porous nickel sintered plaque, a second step of heat-treating the sintered plaque formed with the cobalt hydroxide in presence of an alkali solution and oxygen, and a third step of carrying out an active material filling operation for impregnating the heat-treated sintered plaque with an acidic nickel salt.

The cobalt hydroxide may be formed in the first step by immersing the sintered plaque in an aqueous solution of cobalt nitrate and thereafter immersing the sintered plaque in heated caustic soda.

In one preferred embodiment, the active material filling operation in the third step is carried out by impregnating the porous nickel sintered plaque with the acidic nickel salt and thereafter subjecting the sintered plaque to an alkali treatment.

Alternatively, the active material filling operation may be carried out by immersing the sintered plaque in a heated aqueous solution of nickel nitrate and thereafter immersing the sintered plaque in a caustic soda solution.

The object of the present invention is fulfilled also by a manufacturing method comprising a first step of forming cobalt hydroxide on surfaces of a porous nickel sintered plaque, a second step of changing the cobalt hydroxide formed on the surfaces of the sintered plaque into cobalt oxyhydroxide or cobalt oxyhydroxide and cobaltosic oxide($Co_3O_4$) having a reduced crystallinity, and a third step of carrying out an active material filling operation for the sintered plaque formed with the cobalt oxyhydroxide.

In this method also, the cobalt hydroxide may be formed in the first step by immersing the sintered plaque in an aqueous solution of cobalt nitrate and thereafter immersing the sintered plaque in heated caustic soda.

Preferably, the cobalt oxyhydroxide is formed in the second step by effecting a heat treatment without removing alkali solution from the sintered plaque prepared in the first step.

The active material filling operation in the third step may be carried out by impregnating the porous nickel sintered plaque with the acidic nickel salt and thereafter subjecting the sintered plaque to an alkali treatment.

Alternatively, the active material filling operation in the third step may be carried out by immersing the sintered plaque in a heated aqueous solution of nickel nitrate and thereafter immersing the sintered plaque in a caustic soda solution.

The cobalt oxyhydroxide formed in the second step is a compound having a greater oxidation number and less vulnerable to corrosion than cobalt hydroxide. The cobalt oxyhydroxide layer on the surfaces of the sintered plaque acts as a passivating layer to protect the sintered plaque in acid nickel salt. Consequently, such a layer has a reliable effect of preventing the nickel sintered plaque from being corroded and embrittled even when immersed in a high temperature, high concentration impregnant of acid nickel salt. Further, the cobalt oxyhydroxide has a good conductivity compared with nickel oxide, thereby to provide a satisfactory conductivity between the active material and sintered plaque. These features are believed to enable the above-mentioned methods to fulfilled the object of the present invention.

In a further preferred embodiment of the invention, the heat treatment in the second step is effected at a temperature of 50° C. or above. This greatly expedites the formation of cobalt oxyhydroxide, thereby to realize a drastic reduction in the manufacturing cost of electrodes.

Advantageously, this heat treatment is effected at a temperature not exceeding 250° C. This is effective to prevent the nickel of the sintered plaque from oxidizing into nickel oxide.

Other features and advantages of the present invention will be apparent from the following description.

DETAILED DESCRIPTION OF THE PREFERRED EMBODIMENT

First, a sintered plaque of about 80% porosity obtained by sintering nickel in a reducing atmosphere was immersed in an aqueous solution of cobalt nitrate having a specific gravity of 1.2. Next, the sintered plaque is immersed in 80° C. 25% caustic soda to form a cobalt hydroxide layer on surfaces of the sintered plaque. Then the sintered plaque is heated in the air of 80% humidity at 90° C. without removing the alkali solution contained in the sintered plaque, to change the cobalt hydroxide into cobalt oxyhydroxide covering the surfaces of the sintered plaque. Thereafter the sintered plaque is sufficiently rinsed with water to remove the alkali solution from the sintered plaque. Subsequently, the sintered plaque covered with the cobalt oxyhydroxide layer is immersed in an aqueous solution of nickel nitrate having a temperature of 80° C. and a specific gravity of 1.75. A nickel hydroxide electrode according to the present invention was produced by repeating an active material filling operation five times for changing nickel nitrate into nickel hydroxide in the 25% caustic soda solution.

The electrode thus manufactured is hereinafter referred to as electrode A of the present invention.

COMPARATIVE EXAMPLES

An electrode was manufactured by carrying out the above active material filling operation on the sintered plaque obtained by sintering nickel in a reducing atmosphere as above but without thereafter subjecting to any treatments mentioned above. The electrode thus manufactured is hereinafter referred to as comparative electrode B.

An electrode was manufactured by carrying out the above active material filling operation on the sintered plaque formed of sintered nickel and carrying cobalt hydroxide on its surfaces, but without thereafter subjecting to the oxdizing treatment. The electrode thus manufactured is hereinafter referred to as comparative electrode C.

Figure 1:
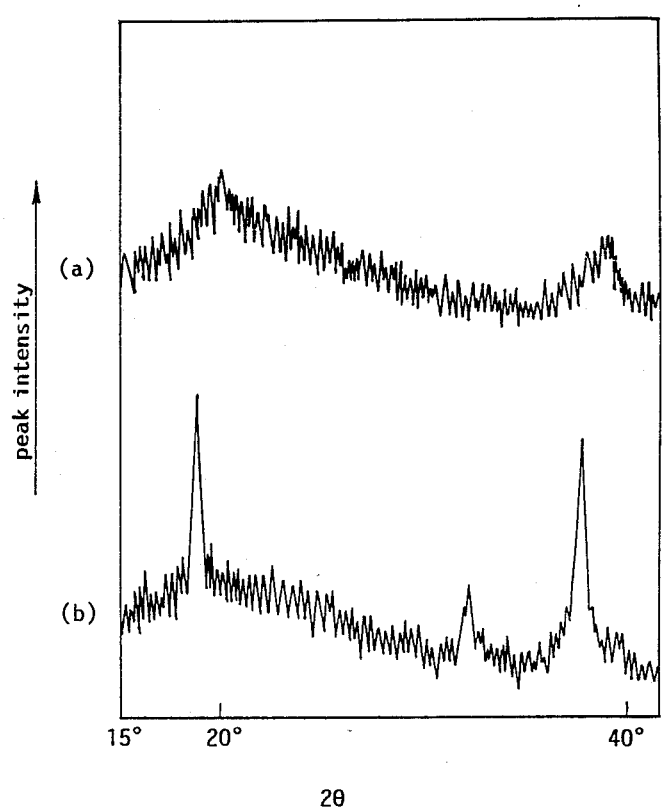
FIG. 1 shows X-ray diffraction patterns of principal surface portion of a nickel sintered plaque, in which (a) represents an X-ray diffraction pattern after a heat treatment, and (b) represents an X-ray diffraction pattern before the heat treatment.

Principal surface portions of the nickel sintered plaque were checked with X-ray diffraction after the heat treatment and before the heat treatment. The results are shown at (a) and (b) of FIG. 1, respectively. As seen from FIG. 1(a), $2\theta$ after the heat treatment has peaks at 20.2 degrees and 38.8 degrees. This indicates that cobalt oxyhydroxide is formed on the sintered plaque surfaces after the heat treatment. On the other hand, it will be seen from FIG. 1(b) that $2\theta$ before the heat treatment has peaks at 19.0 degrees, 32.4 degrees and 37.9 degrees. This indicates that cobalt hydroxide is formed on the sintered plaque surfaces before the heat treatment.

Further, electrode A of this invention, comparative electrodes B and C were checked with respect to the relationship between the sintered plaque potential and the immersion period at the first immersion in the aqueous solution of nickel nitrate during the active material filling operation. The results are shown in FIG. 2.

Figure 2:
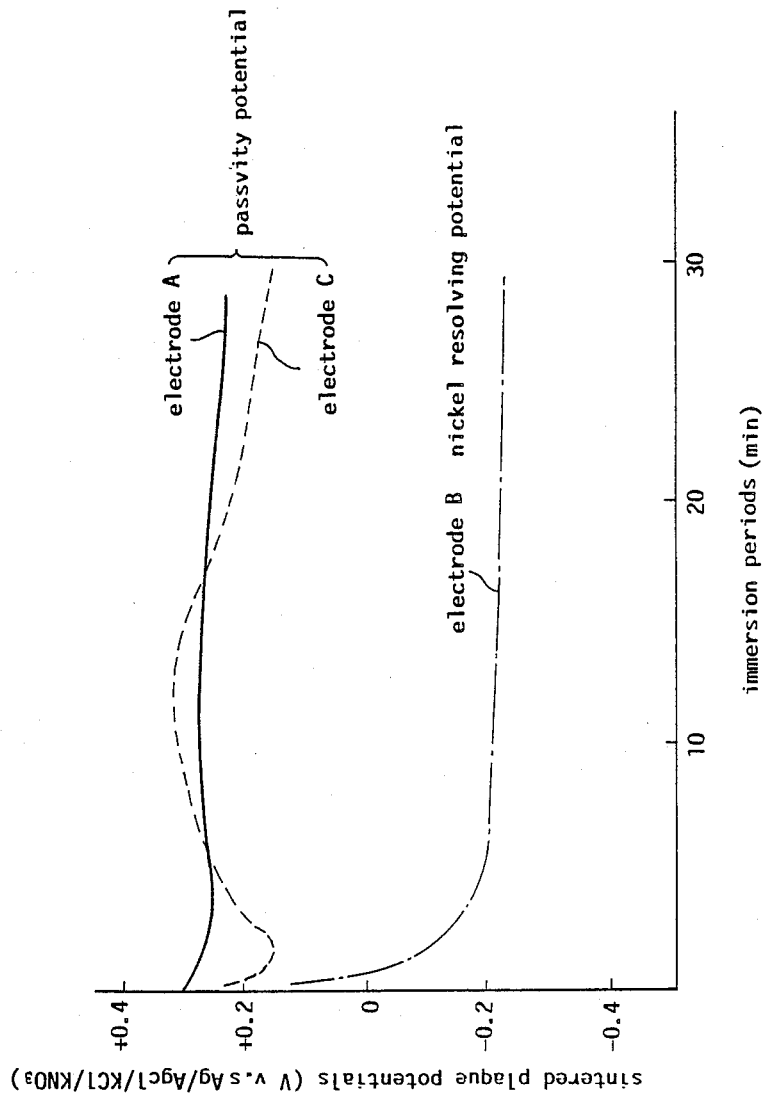
FIG. 2 is a graph showing a relationship between sintered plaque potentials and immersion periods at a first immersion in an aqueous solution of nickel nitrate during an active material filling operation for electrode A manufactured by a method according to the present invention and electrodes B and C manufactured by comparative methods.

As seen from FIG. 2, the sintered plaque of comparative electrode B falls to the nickel dissolving potential in about 5 minutes of immersion, whereas the sintered plaque of electrode of this invention A constantly shows a passivity potential while being immersed in the impregnant solution having high corrosivity. This indicates that the sintered plaque of electrode A has an excellent corrosion resistance and does not reach the dissolving potential.

Figure 3:
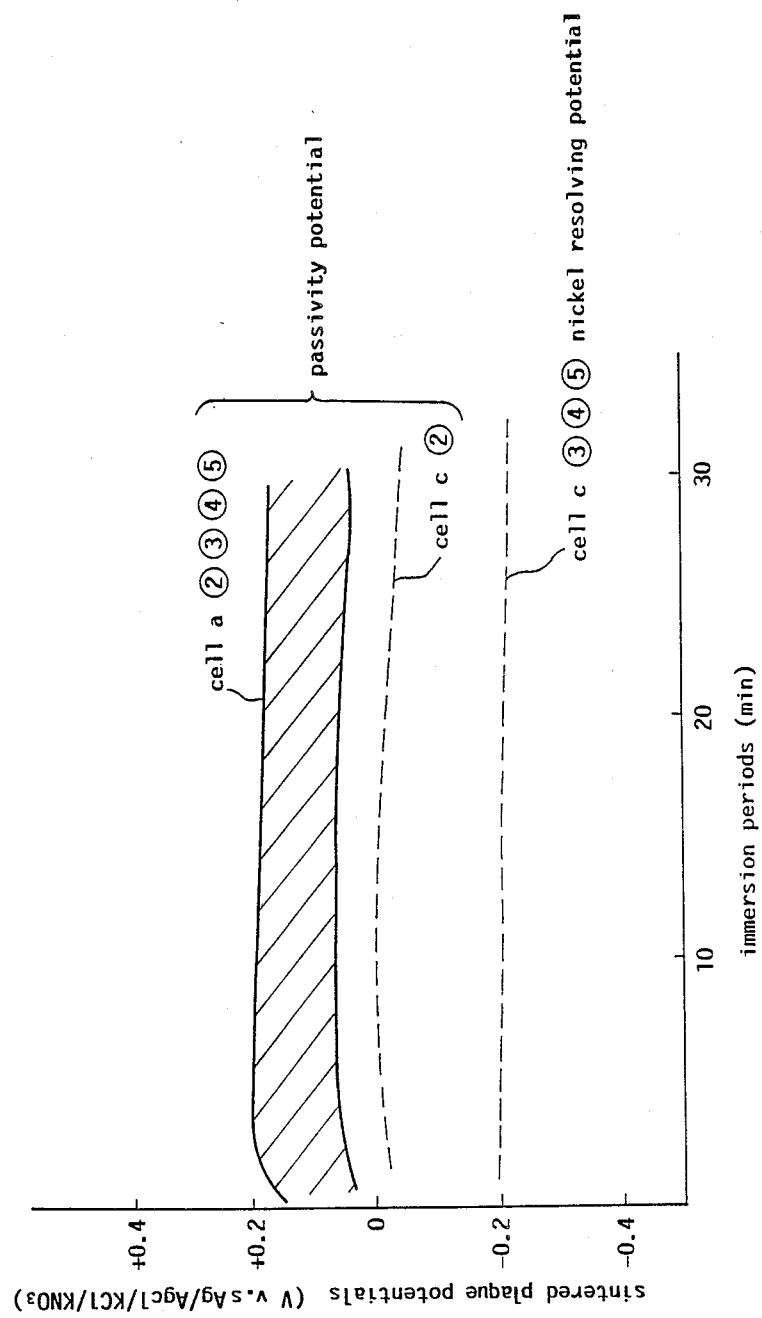
FIG. 3 is a graph showing the relationship between the sintered plaque potentials and immersion periods at a second to a fifth immersions in the aqueous solution of nickel nitrate for electrode A and electrode C.

Electrode A of the present invention showing excellent characteristics at the first immersion and comparative electrode C manufactured by the comparative method were checked with respect to the sintered plaque potential at the second to fifth immersions. The results are shown in FIG. 3. In this graph, the second immersion is represented by number 2 encircled, the third immersion by number 3 encircled, and so on.

As seen from FIG. 3, comparative electrode C becomes the nickel dissolving potential at the third immersion et seq. whereas electrode A of the present invention has the sintered plaque showing the passivity potential even at the fifth immersion, i.e. excellent corrosion resistance. It is believed that the sintered plaque formed with cobalt oxyhydroxide on its surfaces has excellent corrosion resistance because cobalt oxyhydroxide (CoOOH) has a greater oxidation number of +3 and more corrosion-resistant than cobalt hydroxide($Co(OH)_2$).

Figure 4:
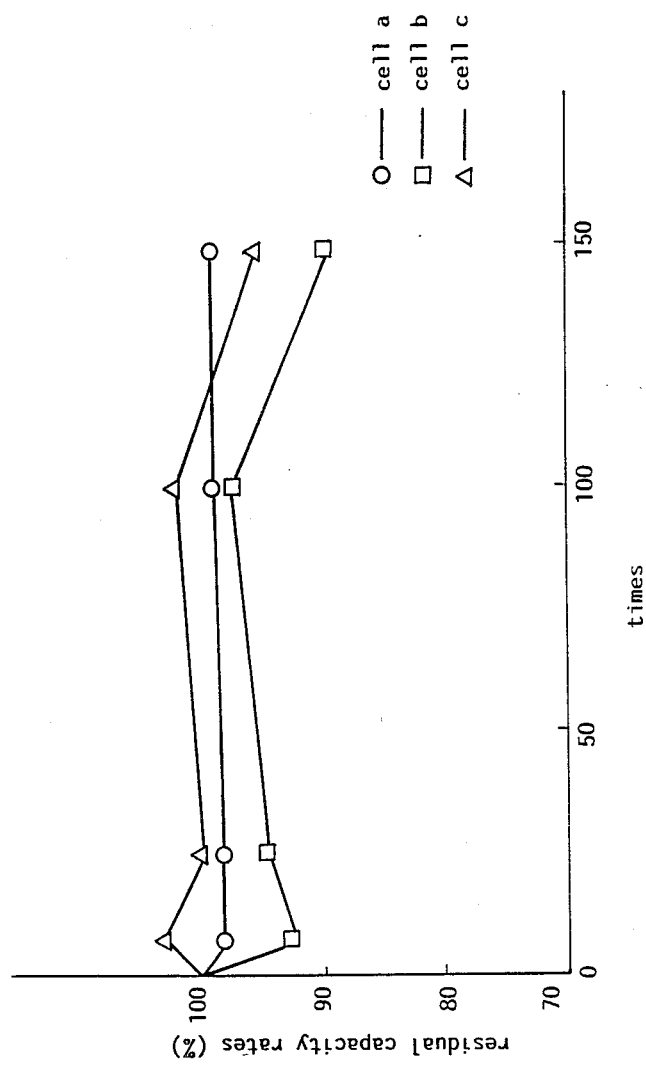
FIG. 4 is a graph showing cycle characteristics of cell a employing electrode A, cell b employing electrode B, and cell c employing electrode C.

Nickel-cadmium cells having a nominal capacity of 1.2AH were fabricated by combining above electrodes A-C with cadmium electrodes manufactured in the same conditions. These cells are hereinafter referred to as cells a-c, respectively. Cycle characteristics of cells a-c were tested, the results of which are shown in FIG. 4. The test was carried out with the conditions that the cells were charged with 1.8A for one hour and then discharged with 1.2A.

As seen from FIG. 4, cells b and c employing the electrodes manufactured by the comparative methods show a significant decline in the residual capacity rate after the 100th cycle, whereas cell a employing the electrode manufactured by the method according to the present invention has a residual capacity rate continuing at a constant level even after the 100th cycle. The reason is believed to lie in the following. Electrode A according to this invention has the layer of cobalt oxyhydroxide on the nickel sintered plaque, which prevents dissolution of the sintered plaque even when the active material filling operation is carried out in the impregnant solution having high corrosivity. This provides the electrode with excellent strength enough to prevent the active material from falling through repeated charging and discharging. Moreover, since cobalt oxyhydroxide has a good conductivity, there occurs no increase in the resistance as distinct from the case where a large amount of nickel oxide is formed on the sintered plaque surfaces.

Figure 5:
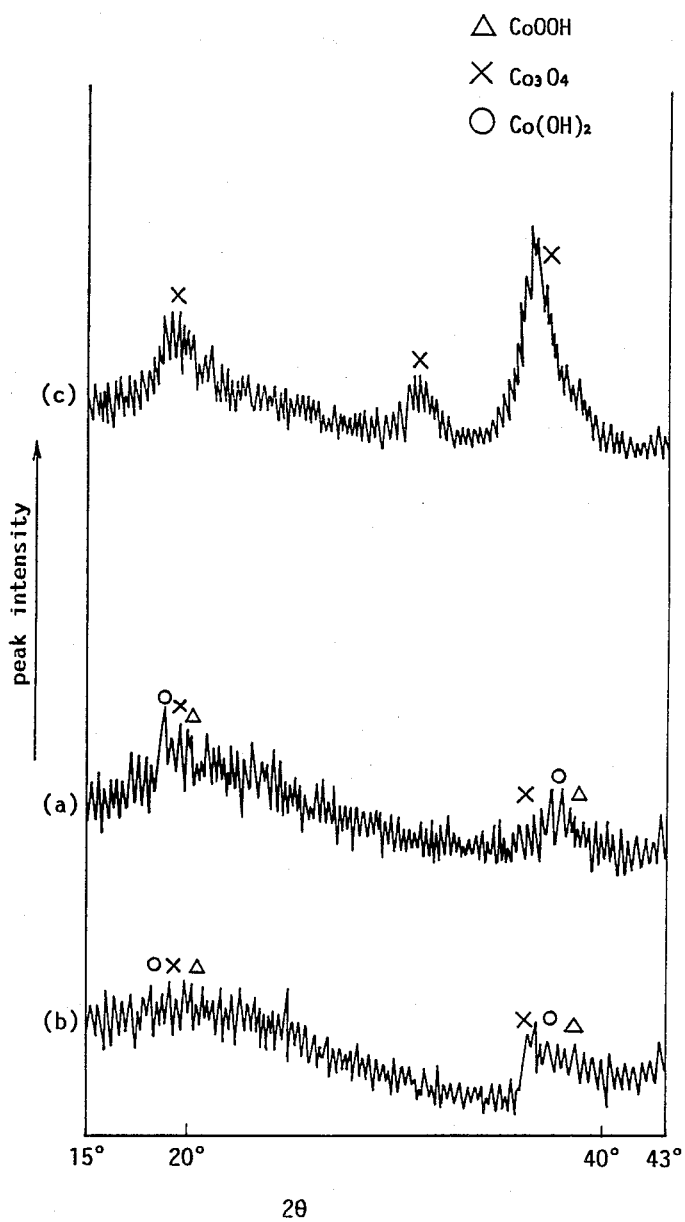
FIG. 5 shows X-ray diffraction patterns where heating conditions are varied for changing cobalt hydroxide into cobalt oxyhydroxide and cobaltosic oxide, in which (a) represents an X-ray diffraction pattern where a heat treatment was effected at 80° C. in the presence of both alkali solution and oxygen, (b) represents an X-ray diffraction pattern where the heat treatment was effected at 200° C. in the presence of both alkali solution and oxygen, and (c) represents an X-ray diffraction pattern where the heat treatment was effected at 200° C. in the presence of oxygen.

An X-ray diffraction was carried out by varying heating conditions for changing cobalt hydroxide into cobalt oxyhydroxide and cobaltosic oxide. The results are shown at (a)-(c) in FIG. 5. FIG. 5(a) shows a diffraction pattern where the heat treatment was effected at 80° C. in the presence of both alkali solution and oxygen. FIG. 5(b) shows a diffraction pattern where the heat treatment was effected at 200° C. in the presence of both alkali solution and oxygen. FIG. 5(c) shows a diffraction pattern where the heat treatment was effected at 200° C. in the presence of oxygen.

As seen from FIG. 5(a), it is observed that the heat treatment effected at 80° C. in the presence of alkali solution and oxygen produces not only cobalt oxyhydroxide but cobaltosic oxide (marked X). It is experimentally proved that this cobaltosic oxide is formed by a heat treatment at a temperature of 80° C. or higher. Further, the cobaltosic oxide is found to be capable like cobalt oxyhydroxide of checking corrosion of the sintered plaque at the time of impregnation. However, compared with the cobaltosic oxide (FIG. 2(c)) obtained simply by a heat treatment at a temperature of 150° C. or higher (i.e. in the absence of alkali solution and oxygen), the cobaltosic oxide (FIG. 2(b)) obtained by a heat treatment at the temperature of 150° C. or higher and in the presence of alkali solution and oxygen has a lower crystallinity. Accordingly, the cobaltosic oxide formed by the method of this invention improves the corrosion resistance of the sintered plaque and the conductivity between the sintered plaque and the active material. These features enable an improvement in the utility factor of the active materials and charging efficiency.

Cobalt oxyhydroxide is produced with ease at a relatively low temperature as noted above. Its reasons are believed to lie in that, since oxygen is highly soluble to alkali solution, dissolved oxygen in alkali solution promotes oxidation of cobalt hydroxide and that cobalt hydroxide forms complex ions which resolve in alkali solution, thereby to be easily affected by the dissolved oxygen.

Further, when providing the heat treatment in the air as in the foregoing embodiment, the air may be humid. This condition is effective to avoid the influence of carbon dioxide and allow cobalt hydroxide to oxidize smoothly.

In addition, with the described manufacturing method, there is no possibility, at the time of forming cobalt oxyhydroxide, of entry of impurities harmful to electrode performance of the alkaline cell and the reaction and process controls are effected at relatively low temperatures. Thus, the method of manufacturing a nickel hydroxide electrode according to the present invention may be practices with ease.

What is claimed is:

1. A method of manufacturing a nickel hydroxide electrode for use in an alkaline storage cell, comprising:
    a first step of forming cobalt hydroxide on the surface of a porous nickel sintered plaque by impregnating the sintered plaque with a cobalt salt and then immersing the sintered plaque in an alkali solution,
    a second step of heat-treating the sintered plaque having the cobalt hydroxide formed on its surface in presence of an alkali solution and oxygen, and
    a third step of carrying out an active material filling operation for impregnating the heat-treated sintered plaque with an acidic nickel salt.

2. A method as claimed in claim 1, wherein the porous nickel sintered plaque used in the first step is sintered in a reducing atmosphere.

3. A method as claimed in claim 1, wherein the sintered plaque is heated while immersed in the alkali solution.

4. A method as claimed in claim 1, wherein the heat treatment in the second step is effected at a temperature of at least 50° C.

5. A method as claimed in claim 1, wherein the heat treatment in the second step is effected at a temperature not exceeding 250° C.

6. A method as claimed in claim 1, wherein the heat treatment in the second step is effected in the air at a temperature of 90° C. and a humidity of 80%.

7. A method as claimed in claim 1, wherein the active material filling operation in the third step is carried out by impregnating the porous nickel sintered plaque with the acidic nickel salt and thereafter subjecting the sintered plaque to an alkali treatment.

8. A method as claimed in claim 1, wherein the active material filling operation in the third step is carried out by immersing the sintered plaque in a heated aqueous solution of nickel nitrate and thereafter immersing the sintered plaque in a caustic soda solution.

9. A method of manufacturing a nickel hydroxide electrode for use in an alkaline storage cell, comprising
    a first step of forming cobalt hydroxide on the surface of a porous nickel sintered plaque by impregnating the sintered plaque with a cobalt salt and immersing the sintered plaque in an alkali solution,
    a second step of changing the cobalt hydroxide formed on the surface of the sintered plaque into cobalt oxyhydroxide or cobalt oxyhydroxide and cobaltosic oxide having a reduced crystallinity, and
    a third step of carrying out an active material filling operation for the sintered plaque formed with the cobalt oxyhydroxide.

10. A method as claimed in claim 9, wherein the porous nickel sintered plaque used in the first step is sintered in a reducing atmosphere.

11. A method as claimed in claim 9, wherein the sintered plaque is heated while immersed in the alkali solution.

12. A method as claimed in claim 9, wherein the cobalt oxyhydroxide is formed in the second step by effecting a heat treatment without removing alkali solution from the sintered plaque prepared in the first step.

13. A method as claimed in claim 12, wherein the heat treatment in the second step is effected at a temperature of at least 50° C.

14. A method as claimed in claim 12, wherein the heat treatment in the second step is effected at a temperature not exceeding 250° C.

15. A method as claimed in claim 9, wherein the active material filling operation in the third step is carried out by impregnating the porous nickel sintered with the acidic nickel salt and thereafter subjecting the sintered plaque to an alkali treatment.

16. A method as claimed in claim 9, wherein the active material filling operation in the third step is carried out by immersing the sintered plaque in a heated aqueous solution of nickel nitrate and thereafter immersing the sintered plaque in a caustic soda solution.

* * * * *